United States Patent
Kwon et al.

(10) Patent No.: US 8,594,649 B2
(45) Date of Patent: Nov. 26, 2013

(54) METHOD AND SYSTEM FOR ACQUIRING APPLICATION IN MOBILE DEVICE

(75) Inventors: Jeong Il Kwon, Seoul (KR); Bu Seop Jung, Suwon-si (KR); Jung Hun Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/404,340

(22) Filed: Feb. 24, 2012

(65) Prior Publication Data

US 2012/0220282 A1 Aug. 30, 2012

(30) Foreign Application Priority Data

Feb. 24, 2011 (KR) .................. 10-2011-0016314

(51) Int. Cl.
*H04W 88/02* (2009.01)
(52) U.S. Cl.
USPC .................................. 455/418; 717/178

(58) Field of Classification Search
USPC ................... 455/412.1–414.4, 418–420; 717/174–178
See application file for complete search history.

(56) References Cited

U.S. PATENT DOCUMENTS

2011/0070834 A1* 3/2011 Griffin et al. ............... 455/41.1
2011/0276961 A1* 11/2011 Johansson et al. ............. 717/178

FOREIGN PATENT DOCUMENTS

JP 2006-099299 A 4/2006
WO WO 2010077194 A1 * 7/2010

* cited by examiner

*Primary Examiner* — Kashif Siddiqui
(74) *Attorney, Agent, or Firm* — Jefferson IP Law, LLP

(57) ABSTRACT

A method, system and mobile device for searching for and acquiring a desired application by using Near Field Communication (NFC) regardless of time and location are provided. In the method, the mobile device reads a keyword from an NFC tag of a target structure in response to a tagging event between the mobile device and the NFC tag. Then the mobile device performs an application search using the keyword, and downloads a specific application found using the keyword.

18 Claims, 4 Drawing Sheets

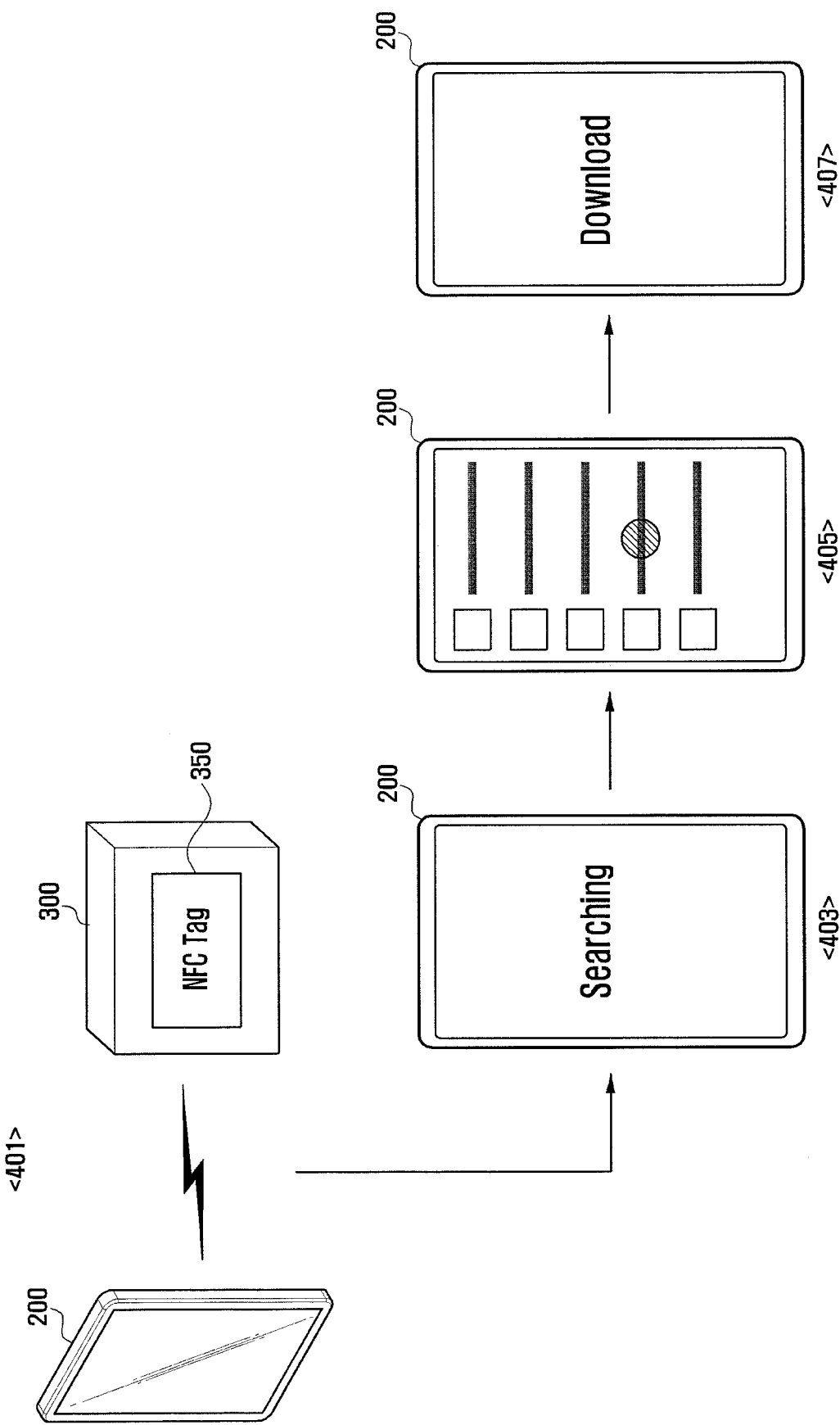

METHOD AND SYSTEM FOR ACQUIRING APPLICATION IN MOBILE DEVICE

PRIORITY

This application claims the benefit under 35 U.S.C. §119 (a) of a Korean patent application filed on Feb. 24, 2011 in the Korean Intellectual Property Office and assigned Serial No. 10-2011-0016314, the entire disclosure of which is hereby incorporated by reference.

BACKGROUND OF THE INVENTION

1. Field of the Invention

The present invention relates to a technology for acquiring an application in a mobile device. More particularly, the present invention relates to a method, system and mobile device for searching for and acquiring a desired application by using Near Field Communication (NFC) regardless of time and location.

2. Description of the Related Art

With the remarkable growth of related technologies, a variety of mobile devices, such as a mobile communication device, a Personal Digital Assistant (PDA), an electronic scheduler, a smart phone, and a tablet Personal Computer (PC), are becoming increasingly popular. Recent mobile devices have various optional functions, such as a video call, a digital camera, and a wireless Internet access, in addition to traditional functions such as a voice call and a Short Message Service (SMS). Also, these mobile devices may optionally provide several data transmission services and various additional services, thereby functioning as multimedia communication devices.

More particularly, most of the recent mobile devices allow access to a wireless Internet network, and a great number of applications relevant to such mobile devices are developed and used. A user who desires to install a certain application may search for and download the desired application through the wireless Internet network.

However, a user may experience difficulty in acquiring a desired application among a great number of applications currently provided through the network. For instance, in order to acquire the desired application, a user should enter a marketplace that provides the desired application, search the marketplace through a keyword input, select an application in search results, download the selected application, and then execute the downloaded application. This complicated process may be inconvenient to the user. Also, costs for accessing the network will increase the longer it takes to acquire the desired application.

SUMMARY OF THE INVENTION

Aspects of the present invention are to address at least the above-mentioned problems and/or disadvantages and to provide at least the advantages described below. Accordingly, an aspect of the present invention is to simplify a process of acquiring an application and also reduce unnecessary costs by using Near Field Communication (NFC) technology in a mobile device.

Another aspect of the present invention is to conveniently acquire a desired application by realizing an easier search and download of applications through NFC technology regardless of time and location.

Still another aspect of the present invention is to enhance usability and competitiveness of a mobile device and user convenience by providing an optimal environment for acquiring an application of a mobile device.

According to an aspect of the present invention, a method for acquiring an application of a mobile device is provided. The method includes reading a keyword from an NFC tag in response to a tagging event, performing an application search using the keyword, and downloading a specific application found using the keyword.

According to another aspect of the present invention, a system for acquiring an application of a mobile device is provided. The system includes a target structure having an NFC tag containing a keyword about at least one application relevant to the target structure, and the mobile device for reading the keyword from the NFC tag in response to a tagging with the NFC tag, for performing an application search using the keyword, and for downloading a specific application found using the keyword.

According to yet another aspect of the present invention, a mobile device for acquiring an application is provided. The mobile device includes an NFC module for performing a tagging event with an NFC tag, and a control unit for controlling the NFC module to read a keyword from the NFC tag in response to the tagging event, for performing an application search using the keyword, and for downloading a specific application found using the keyword.

According to various aspects of the present invention, the mobile device may read a keyword about an application relevant to a specific target structure by using NFC technology and then download the application through a search based on the read keyword. This may simplify and automate a process of acquiring an application and thereby enhance user convenience. Also, a search and download for a desired application may be rapidly and easily performed through only a tagging between the mobile device and the target structure regardless of time and location. In addition, an optimal environment may be provided for acquiring an application of the mobile device and thereby enhance usability and competitiveness of the mobile device as well as user convenience.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 is a schematic view illustrating a process of acquiring an application by a mobile device according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
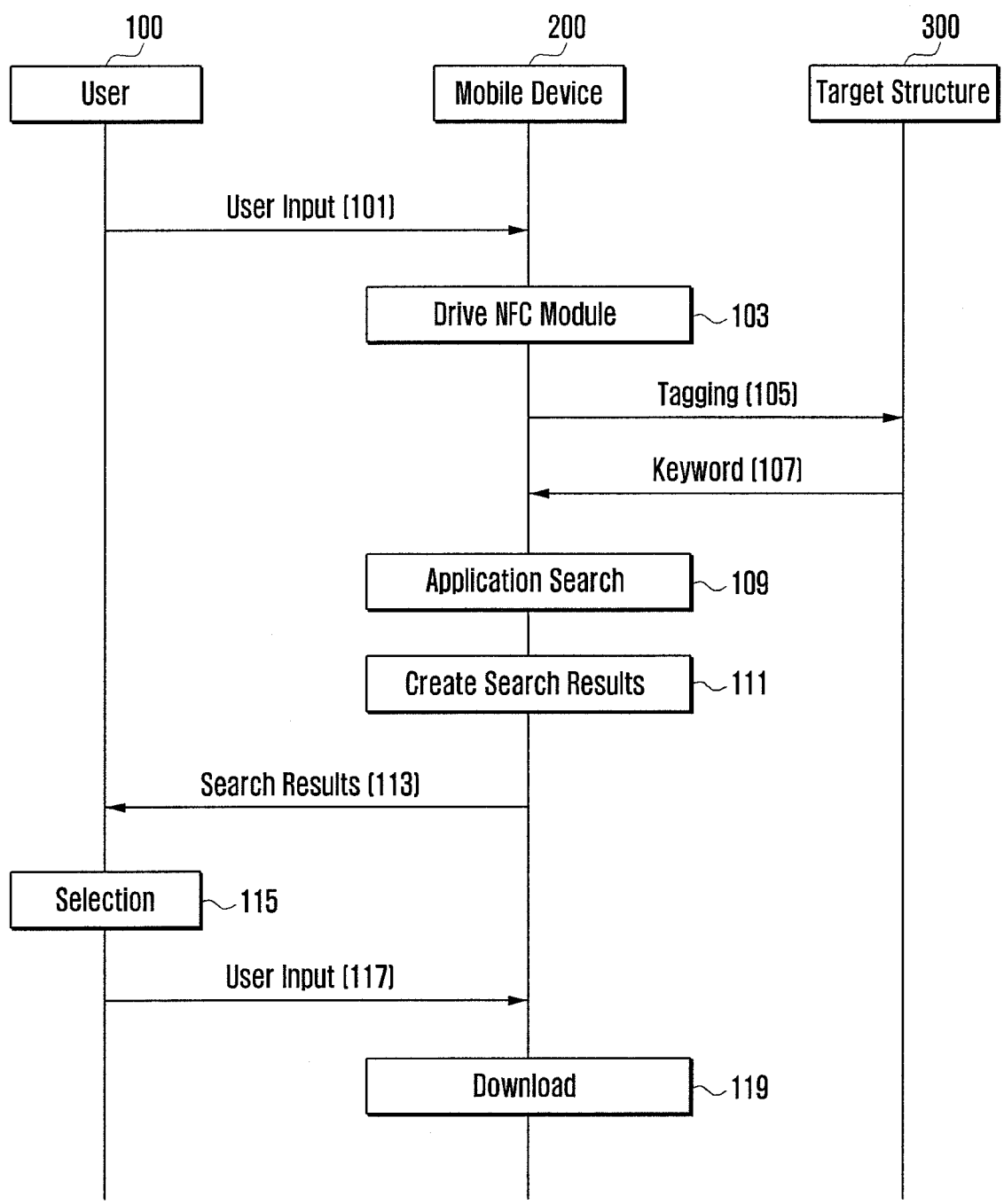
FIG. 1 is a flow diagram illustrating a process of acquiring an application in a system having a mobile device and a target structure according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Exemplary embodiments of the present invention relate to a method, system and mobile device in which the mobile device effectively searches for, downloads, and acquires an application through a simplified process that makes use of Near Field Communication (NFC) technology. In exemplary embodiments of the present invention, the mobile device may include suitable elements for supporting an NFC service, which is based on a short range communication (e.g., within 10 cm) and is typically used for electronic payment, data communication, etc. The NFC service is similar to Radio Frequency IDentification (RFID) technology and uses a specific frequency band (e.g., 13.56 MHz). The mobile device may have an NFC module in order to perform the NFC service and can read data or information from an NFC tag through the NFC module. Additionally, this mobile device may transmit data or information to another device having such an NFC module.

Although the disclosure set forth herein is based on the assumption that the mobile device employs NFC technology, the present invention may be alternatively supported by any other wireless connectivity technologies, for example, Bluetooth, Zigbee, Ultra WideBand (UWB), Infrared Data Association (IrDA), or the like. Therefore, the mobile device of an exemplary embodiment of the present invention may further include any element for supporting the above-mentioned wireless connectivity technologies, for example, a Bluetooth communication module, a Zigbee communication module, a UWB communication module, an IrDA communication module, or any other short range communication module.

Now, a mobile device and its operation according to an exemplary embodiment of the present invention will be described with reference to the drawings. Embodiments set forth hereinafter are, however, only exemplary and are not to be considered as a limitation of the present invention. As will be understood by persons skilled in the art, any other alternative embodiments may be favorably used.

FIG. 1 is a flow diagram illustrating a process of acquiring an application in a system having a mobile device and a target structure according to an exemplary embodiment of the present invention.

As shown in FIG. 1, the system of an exemplary embodiment of the present invention may be composed of a mobile device 200 and a target structure 300. Additionally, as discussed below, the mobile device 200 may have an NFC module (210 in FIG. 2), and the target structure 300 may have an NFC tag (350 in FIG. 4). The mobile device 200 may be one of mobile communication devices that operate based on various communication protocols of various communication systems, or any other communication equipment that can download an application from a search server in a specific communication network (e.g., a mobile communication network, an Internet network, etc.), including a tablet Personal Computer (PC), a smart phone, a Portable Multimedia Player (PMP), a Personal Digital Assistant (PDA), a digital broadcasting player, a portable game console, etc. The target structure 300 may be any electronic device that is carried by a user or stationary, including a PMP, a PDA, a digital broadcasting player, an audio player, a portable game console, a computer, a notebook, a TV, a Large Format Display (LFD), a Digital Signage (DS), a media pole, a printer, etc.

Referring to FIG. 1, at the outset, a user 100 may enter a user input in the mobile device 200 to download an application in connection with the target structure 300 in step 101. For instance, the user 100 may manipulate the mobile device 200 to execute a download mode for downloading applications.

Once the mobile device 200 detects a user input such as a request for the execution of a download mode, the mobile device 200 may drive the NFC module in step 103. In another exemplary embodiment of the present invention, the NFC module of the mobile device 200 may be in an always-on state, and step 103 may be unnecessary in this case. Also, a download mode may be automatically executed in response to a tagging between the NFC module in the always-on state and the NFC tag of the target structure 300.

Next, the user 100 may perform a tagging by which the mobile device 200 approaches within the range of recognizing the NFC tag 350 of the target structure 300 in step 105. The mobile device 200 may detect a tagging event in the download mode and also may read data or information from the NFC tag 350 of the target structure 300. More particularly, the NFC tag 350 may contain keywords about applications relevant to the target structure 300, and such a keyword may indicate information that allows for a search of an application. Therefore, the mobile device 200 may receive a keyword from the NFC tag 350 corresponding to the target structure 300 in step 107.

After receiving the specific keyword, the mobile device 200 may perform an application search using the received keyword in step 109. In this step, the mobile device 200 may execute a particular application (e.g., a market application) for searching for and downloading applications and then may access a selected network (especially, a search server in the network) through the executed particular application. Therefore, this step may further include a step of activating a communication module for network access. After the network is accessed, the mobile device 200 may automatically perform an application search using the keyword.

Next, the mobile device 200 may create results of the search using the keyword in step 111 and then may provide the search results to the user 100 in step 113. Namely, the mobile device 200 may output the search results through a display unit (230 in FIG. 2).

Next, the user 100 may select a desired application from the search results in step 115, and also may enter a user input in the mobile device 200 in step 117 to download the selected application. The mobile device 200 may download the selected application from the network in response to the user input in step 119. Thereafter, the mobile device 200 may store and install the downloaded application.

Figure 2:
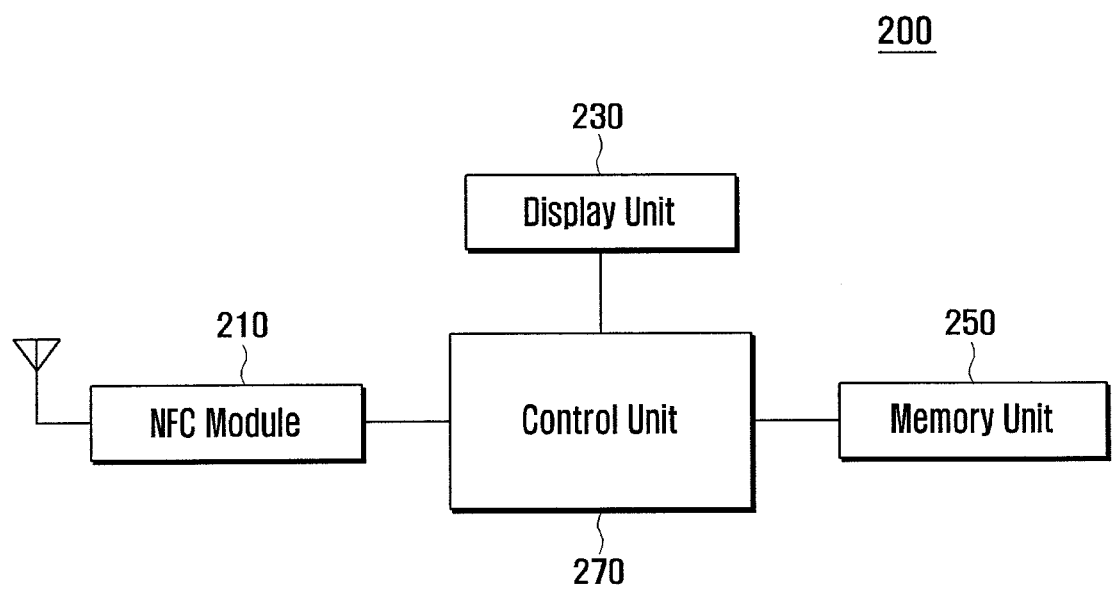
FIG. 2 is a block diagram illustrating a schematic configuration of a mobile device according to an exemplary embodiment of the present invention.

FIG. 2 is a block diagram illustrating a schematic configuration of a mobile device according to an exemplary embodiment of the present invention.

Referring to FIG. 2, the mobile device 200 includes an NFC module 210, a display unit 230, a memory unit 250, and a control unit 270. Additionally, the mobile device 200 may further include an audio processing unit having a microphone and a speaker, a digital broadcast module for receiving and playing digital broadcasting such as Digital Multimedia Broadcasting (DMB) or Digital Video Broadcasting (DVB), a camera module for taking a photo or recording a video, a touch pad or touch screen for supporting a touch-based input, a key input unit for supporting a mechanical key input, a Radio Frequency (RF) communication module for supporting a mobile communication based or Internet based communication service, a battery for supplying power to such elements, and the like. Since these elements are well known in the art, related illustration and description will be omitted herein.

The NFC module 210 supports a communication service based on a short range wireless communication. The NFC module 210 detects the proximity or contact (e.g., a tagging) with the NFC tag 350 of the target structure 300, creates a detection signal (e.g., a tagging event), and sends the signal to the control unit 270. More particularly, in exemplary embodiments of the present invention, the NFC module 210 reads data or information (e.g., a keyword) from the NFC tag 350 and sends the read data to the control unit 270. The NFC module 210 of an exemplary embodiment of the present invention may be in the always-on state or may be turned on when the download mode is activated.

The display unit 230 represents data or information in connection with the operation or state of the mobile device 200. For instance, the display unit 230 may offer various execution screens of applications or functions supported in the mobile device 200, including a home screen, a message service, e-mail, Internet, search, communication, e-book, video play, camera, image viewer, broadcasting, music, game, etc. More particularly, the display unit 230 may display a screen related to the download mode, such as an application search screen based on a keyword received from the NFC tag 350, a list screen showing search results, a download progress screen about a selected application, or the like.

The display unit 230 may be implemented using any of a Liquid Crystal Display (LCD) device or any other equivalent, such as an Organic Light Emitting Diode (OLED) device or an Active Matrix OLED (AMOLED) device. Additionally, when displaying the above execution screens, the display unit 230 may provide a landscape mode (i.e., a horizontal mode) or a portrait mode (i.e., a vertical mode), depending on the direction of the mobile device 200. Furthermore, in some exemplary embodiments of the present invention, the display unit 230 may have a touch-sensitive interface that supports a touch-based input. For instance, the display unit 230 may receive a touch-based user input through a touch screen, create a resultant input signal, and send the input signal to the control unit 270.

The memory unit 250 stores a variety of programs and related data that are executed and processed in the mobile device 200, and may be composed of at least one nonvolatile memory and volatile memory. The nonvolatile memory may be implemented using Read Only Memory (ROM), flash memory, or the like, and the volatile memory may be implemented using Random Access Memory (RAM) or the like. The memory unit 250 may store continuously or temporarily the operating system of the mobile device 200, programs and data related to a display control of the display unit 230, programs and data related to an input control through the display unit 230, programs and data related to a download mode control of the mobile device 200, and the like.

More particularly, the memory unit 250 may store programs and data related to an application search process using a keyword received from the NFC tag 350, programs and data related to a search result output process, and programs and data related to an application download process. Additionally, the memory unit 250 may store setting information about automatic or manual execution of a download mode, downloaded applications, received keywords, information about the target structure 300 and related applications in connection with received keywords, a list of search results, and the like.

The control unit 270 controls the operations of the mobile device 200. More particularly, the control unit 270 may control operations related to an automatic application search using a keyword received from the NFC tag 350 and operations related to a download mode. For instance, the control unit 270 may detect a tagging event that occurs between the mobile device 100 and the NFC tag 350, and then control a search process using a keyword that the NFC module 210 reads from the NFC tag 350. Also, the control unit 270 may execute a particular application (e.g., a market application) for searching and downloading applications through access to a search server in the network. And also, the control unit 270 may turn on or off the communication module for access to the network when the market application is executed or closed.

Furthermore, the control unit 270 may create search results in the form of a list and then output the search results to the display unit 230. Also, the control unit 270 may control the downloading of an application selected in the search results, and storing and installing of the downloaded application. If the search result contains only one application, the control unit 270 may automatically control downloading of that application without requiring a user's selection. If a keyword-based search fails, the control unit 270 may control a re-searching based on the same keyword. In this re-searching process, the control unit 270 may control an expanded search that further uses another search server. When a download is completed, the control unit 270 may close the market application and also turn off the communication module. In addition, the control unit 270 may turn off the NFC module 210 according to a setting type.

The above-discussed control operations of the control unit 270 will be described again below. In addition, the control unit 270 performs a variety of control operations in connection with normal functions of the mobile device 200. For instance, the control unit 270 may control the execution of any embedded application and the display of related data. Furthermore, the control unit 270 may receive input signals corresponding to various input forms supported by a touch-based input interface and then control corresponding functions. Also, the control unit 270 may control data transmission and reception based on a wired or wireless communication.

Meanwhile, the mobile device 200 shown in FIG. 2 may be applied to all device types such as a bar type, a folder type, a slide type, a swing type, a flip type, etc. Additionally, the mobile device 200 of an exemplary embodiment of the present invention may include any of communication devices, multimedia players and their application equipment, as discussed above, which supports a download mode.

Figure 3:
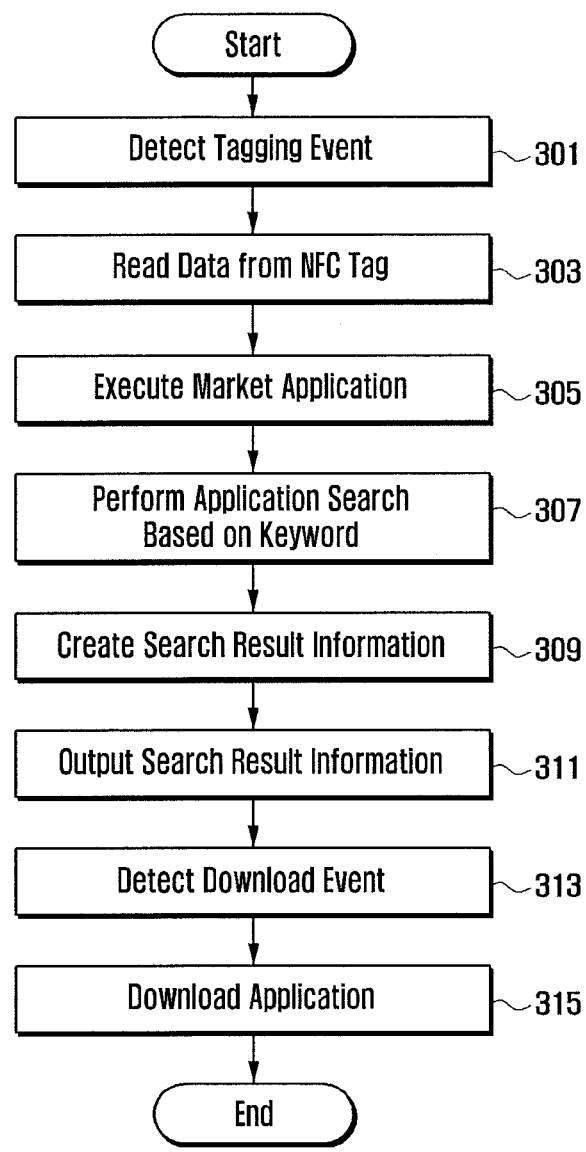
FIG. 3 is a flow diagram illustrating a method for acquiring an application by a mobile device according to an exemplary embodiment of the present invention.

FIG. 3 is a flow diagram illustrating a method for acquiring an application by a mobile device according to an exemplary embodiment of the present invention. FIG. 4 is a schematic view illustrating a process of acquiring an application by a mobile device in accordance with an exemplary embodiment of the present invention.

Referring to FIG. 3, the control unit 270 detects a tagging event in step 301 and then reads data through the NFC module 210 in step 303. This data may be a keyword contained in the NFC tag 350 attached to the target structure 300. In response to a tagging, the NFC module 210 may read a keyword from the NFC tag 350. This example is indicated by a reference number 401 in FIG. 4.

As indicated by the reference number 401, when the user performs a tagging by which the mobile device 200 approaches or touches the NFC tag 350 of the target structure 300, the NFC module 210 of the mobile device 200 may perform a communication based on signal interaction with the NFC tag 350. Then the control unit 270 may receive a tagging event from the NFC module 210. As discussed above, the NFC module 210 may be turned on when a download mode is manually activated at a user's request, and then may read data. Alternatively, the NFC module 210 may be in the always-on state and when the download mode is automatically activated in response to a tagging, may read data.

When receiving data (i.e., a keyword) from the NFC tag 350, the control unit 270 may execute a market application in step 305. As discussed above, the market application accesses a search server through the network and then performs a search and download for an application.

When the market application is executed, the control unit 270 may control an application search using a keyword in step 307. For instance, in response to the execution of the market application, the control unit 270 may automatically enter the keyword received from the NFC tag 350 in the market application and then issue a command for performing the application search based on the keyword. Therefore, the application search using the received keyword may be automatically performed through the search server accessed by the market application. At this time, the control unit 270 may output a search screen through the display unit 210. This example is indicated by a reference number 403 in FIG. 4.

Next, the control unit 270 may create information about results of the keyword-based application search in step 309 and then output the search result information in step 311. For instance, the control unit 270 may obtain search results, create a list of the search results, and output the list through the display unit 210. This example is indicated by a reference number 405 in FIG. 4. This exemplary embodiment shown in FIGS. 3 and 4 is case where a number of search results are provided as a list. If a keyword-based search fails, the control unit 270 may output an error message that indicates a search failure or no result. Then the control unit 270 may control a re-searching process based on the same keyword.

Next, the control unit 270 may detect a download event in step 313. For instance, when the user selects one of applications provided in a list of search results as indicated by the reference number 405, the control unit 270 may recognize a user's selection as the download event.

Then the control unit 270 may control a download of the selected application in step 315. For instance, when a user input for selecting a specific application in the search result list is detected as discussed above, the control unit 270 may understand this user input as a download event and then control the download of the selected application. At this time, the control unit 270 may output a download screen through the display unit 210. This example is indicated by a reference number 407 in FIG. 4.

Thereafter, the control unit 270 may further control a process of storing and installing the downloaded application. Also, the control unit 270 may output any information about the downloaded application through the display unit 210. In addition, the control unit 270 may terminate all operations related to the download mode when the download is completed. For instance, the control unit 270 may close the market application and turn off the communication module.

The above-described methods according to an exemplary embodiment of the present invention can be realized in hardware or as software or computer code that can be stored in a non-transitory recording medium such as a Compact Disc (CD) ROM, a RAM, a floppy disk, a hard disk, or a magneto-optical disk or downloaded over a network, so that the methods described herein can be rendered in such software using a general purpose computer, or a special processor or in programmable or dedicated hardware, such as an Application-Specific Integrated Circuit (ASIC) or Field-Programmable Gate Array (FPGA). As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for acquiring an application of a mobile device, the method comprising:
   reading a keyword from a Near Field Communication (NFC) tag in response to a tagging event;
   performing an application search via a market application using the keyword, in response to reading the keyword; and
   downloading a specific application which a user selects in a list using the keyword,
   wherein the performing of the application search further includes performing a re-searching based on the same keyword when the application search fails.

2. The method of claim 1, wherein the reading of the keyword includes:
   manually activating a download mode in response to a user input;
   turning on an NFC module when the download mode is activated; and reading the keyword from the NFC tag in response to the tagging event between the NFC module and the NFC tag.

3. The method of claim 2, wherein the performing of the application search includes:
   executing the market application in response to reading the keyword;
   automatically entering the keyword in the market application; and
   performing the application search based on the keyword through a search server accessed by the market application.

4. The method of claim 3, wherein the performing of the re-searching includes performing an expanded search that further uses another search server.

5. The method of claim 2, wherein the downloading of the specific application includes, when a single application is found by the application search, automatically downloading the single application without any user input.

6. The method of claim 1, wherein the reading of the keyword includes:
   automatically activating a download mode in response to the tagging event while the NFC module is turned on; and
   reading the keyword from the NFC tag.

7. A system for acquiring an application of a mobile device, the system comprising:
   a target structure having a Near Field Communication (NFC) tag containing a keyword about at least one application relevant to the target structure; and
   the mobile device for reading the keyword from the NFC tag in response to a tagging event with the NFC tag, for performing an application search via a market application using the keyword in response to reading the keyword, and for downloading a specific application which a user selects in a list using the keyword,
   wherein the mobile device performs a re-searching based on the same keyword when the application search fails.

8. The system of claim 7, wherein the mobile device includes:
   an NFC module for detecting the tagging event with the NFC tag and for reading the keyword from the NFC tag; and
   a control unit for performing the application search using the keyword and for downloading the specific application found using the keyword.

9. The system of claim 8, wherein the control unit controls the application search performed in a search server accessed by the market application in response to reading the keyword, turns on a communication module for network access when the market application is executed, and turns off the communication module for network access when the market application is closed.

10. The system of claim 9, wherein the control unit outputs results of the application search in the form of a list on a display unit, downloads the selected application, and stores and installs the downloaded application.

11. The system of claim 9, wherein the control unit, when a single application is found by the application search, automatically downloads the single application without any user input.

12. The system of claim 11, wherein the control unit performs an expanded search that further uses another search server when the re-searching is performed.

13. A mobile device for acquiring an application, the mobile device comprising:
   a Near Field Communication (NFC) module for performing a tagging event with an NFC tag; and
   a controller for controlling the NFC module to read a keyword from the NFC tag in response to the tagging event, for automatically performing an application search via a market application using the keyword in response to reading the keyword, and for downloading a specific application which a user selects in a list using the keyword,
   wherein the controller performs a re-searching based on the same keyword when the application search fails.

14. The mobile device of claim 13, wherein, when reading the keyword, the controller manually activates a download mode in response to a user input, turns on the NFC module when the download mode is activated, and reads the keyword from the NFC tag in response to the tagging event between the NFC module and the NFC tag.

15. The mobile device of claim 14, wherein, when performing the application search, the controller executes the market application in response to reading the keyword, automatically enters the keyword in the market application, and performs the application search based on the keyword through a search server accessed by the market application.

16. The mobile device of claim 15, wherein the controller performs an expanded search that further uses another search server.

17. The mobile device of claim 14, wherein, when a single application is found by the application search, the controller automatically downloads the single application without any user input.

18. The mobile device of claim 13, wherein, when reading the keyword, the controller automatically activates the download mode in response to the tagging event between the NFC module and the NFC tag while the NFC module is turned on, and reads the keyword from the NFC tag.

* * * * *